March 17, 1931.                    E. M. MUELLER                    1,797,175
                      AUXILIARY REEL HOLDER FOR MOVIE CAMERAS
                      Filed March 11, 1929        3 Sheets-Sheet 1

INVENTOR
Emil M. Mueller
BY
george Ramsey
his ATTORNEY

March 17, 1931.　　　　E. M. MUELLER　　　1,797,175
AUXILIARY REEL HOLDER FOR MOVIE CAMERAS
Filed March 11, 1929　　3 Sheets-Sheet 2

INVENTOR
Emil M. Mueller
BY
George Ramsey
ATTORNEY

March 17, 1931.  E. M. MUELLER  1,797,175
AUXILIARY REEL HOLDER FOR MOVIE CAMERAS
Filed March 11, 1929  3 Sheets-Sheet 3

INVENTOR
Emil M. Mueller
BY
George Ramsey
ATTORNEY

Patented Mar. 17, 1931

1,797,175

UNITED STATES PATENT OFFICE

EMIL M. MUELLER, OF BRONX, NEW YORK, ASSIGNOR TO C. P. GOERZ AMERICAN OPTICAL COMPANY, OF NEW YORK, N. Y., A CORPORATION OF NEW YORK

AUXILIARY REEL HOLDER FOR MOVIE CAMERAS

Application filed March 11, 1929. Serial No. 346,069.

The present invention relates to movie cameras and more especially to a removable magazine for special film which may be removed from or inserted in the camera without exposing but a small portion of the special film to the light.

There has recently come into the commercial art a 16 mm. width film adapted for taking and exhibiting pictures in natural color. This film is known to the trade as Kodacolor and is sold on fifty foot reels. There is a hand movie camera well known in the art as "Filmo" camera which is adapted to use 16 mm. width film and consequently is adapted to use the Kodacolor film. The "Filmo" camera is constructed to receive, as a maximum, reels of 16 mm. carrying one hundred feet of film. The usual film used in an amateur movie camera is a black and white film for the reason that colored film, for example, Kodacolor, is expensive and also requires a large amount of light to properly expose the film. Therefore, these special films may be used under only special conditions. It therefore frequently happens that conditions arise where a user may desire to expose only a small amount of colored film in between complete reels of black and white pictures. The 16 mm. film as sold on the market is provided with a light tight paper leader on the lead end of the film and with a paper trailer on the final end of the film. This enables the operator to load the camera in daylight. However, the operator cannot remove a partially used film from the camera without the light striking and spoiling a very considerable amount of film and even if the operator resorts to a dark room to remove a partly exposed film, the operator then has two reels with the film extending between them and no convenient light tight container to handle the reels, and furthermore, there is no assurance that if the reels are reinserted in the camera that the film will start the unexposed portion substantially where the exposed portion left off.

The present invention overcomes the foregoing difficulties by providing a light tight magazine which, in the preferred form, is adapted to fit within a standard "Filmo" camera, and carry fifty feet of film or standard commercial fifty foot reels. This magazine is provided with two compartments having individual closing lids, which seal the reel compartments light tight. The magazine is also provided with openings properly sealed with light valves, through which the operating posts of the Filmo camera extend to engage and operate the reels within the magazine.

When the magazine is loaded, the film extends from the pocket enclosing the supply reel through a light tight valve leading to the exterior of the case. A loop of film or lead paper is formed outside of the magazine case and then it is passed through a light tight valve leading to the pocket enclosing the take-up reel where the end of the lead paper or film is attached to the take-up reel. The magazine is now adapted to be inserted in the Filmo camera over the operating posts and over the film guides of the camera. The film loop is pulled out and properly threaded through the drive sprockets and feed claws adjacent the gate of the camera where exposures are made through the camera lens. The side of the camera casing is then replaced and the camera is now ready for operation.

Assuming the camera to be loaded with Kodacolor film, or other special film, the operator uses the camera in the ordinary way taking such pictures as may be desired. Assuming that twenty-five feet only of special film has been used and the operator desires to change to another film, e. g. a black and white film. The camera is opened up in daylight, thereby exposing a few inches of the special film comprising the loop, which extends outside the removable magazine. The remaining portion of the film being within the magazine is protected from the light. The operator removes the magazine carrying the special film and inserts a second magazine in the camera and proceeds to take pictures on the second film, or the operator may load the camera with a one hundred foot film in the usual way and proceed to take pictures until the one hundred foot film is exhausted. Where a plurality of removable magazines are utilized, however, the operator may change from one to another in daylight before the films in the respective magazines have been exhausted with a loss merely of the film extending outside the magazine casing and forming the loop.

The objects of the present invention will be obvious from the foregoing and succeeding descriptions of the device, and it is to be understood that the present disclosure is that of a preferred form of the invention as a compliance with the patent statutes, but is not to be understood as limiting the scope of the present invention beyond the definitions in the claims.

Like characters are used to represent like parts throughout the several figures of the drawings.

Figure 1:
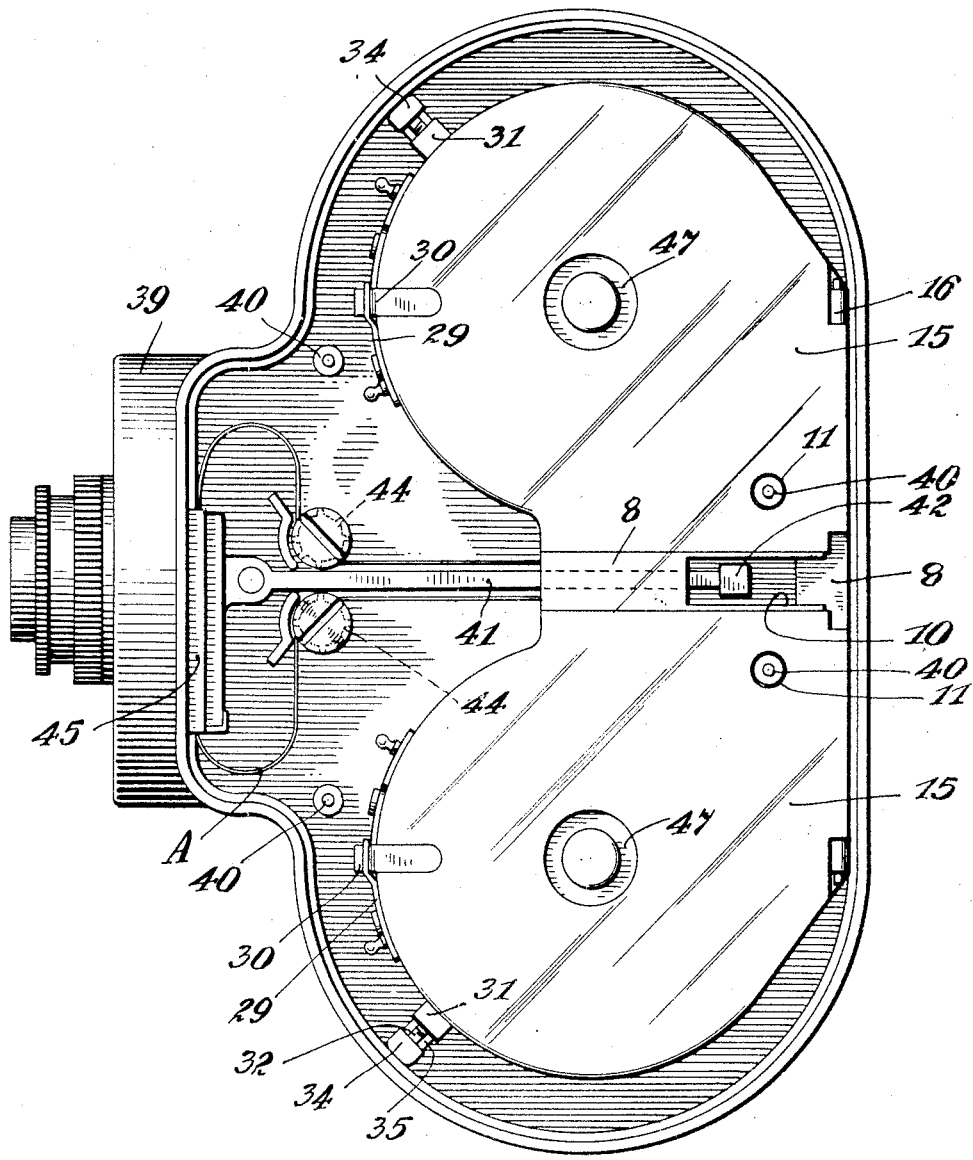
Fig. 1 is a view illustrating the removable magazine set in place in the casing of a Filmo camera with the film threaded ready for operaton and with the side plate of the camera removed.
Figure 2:
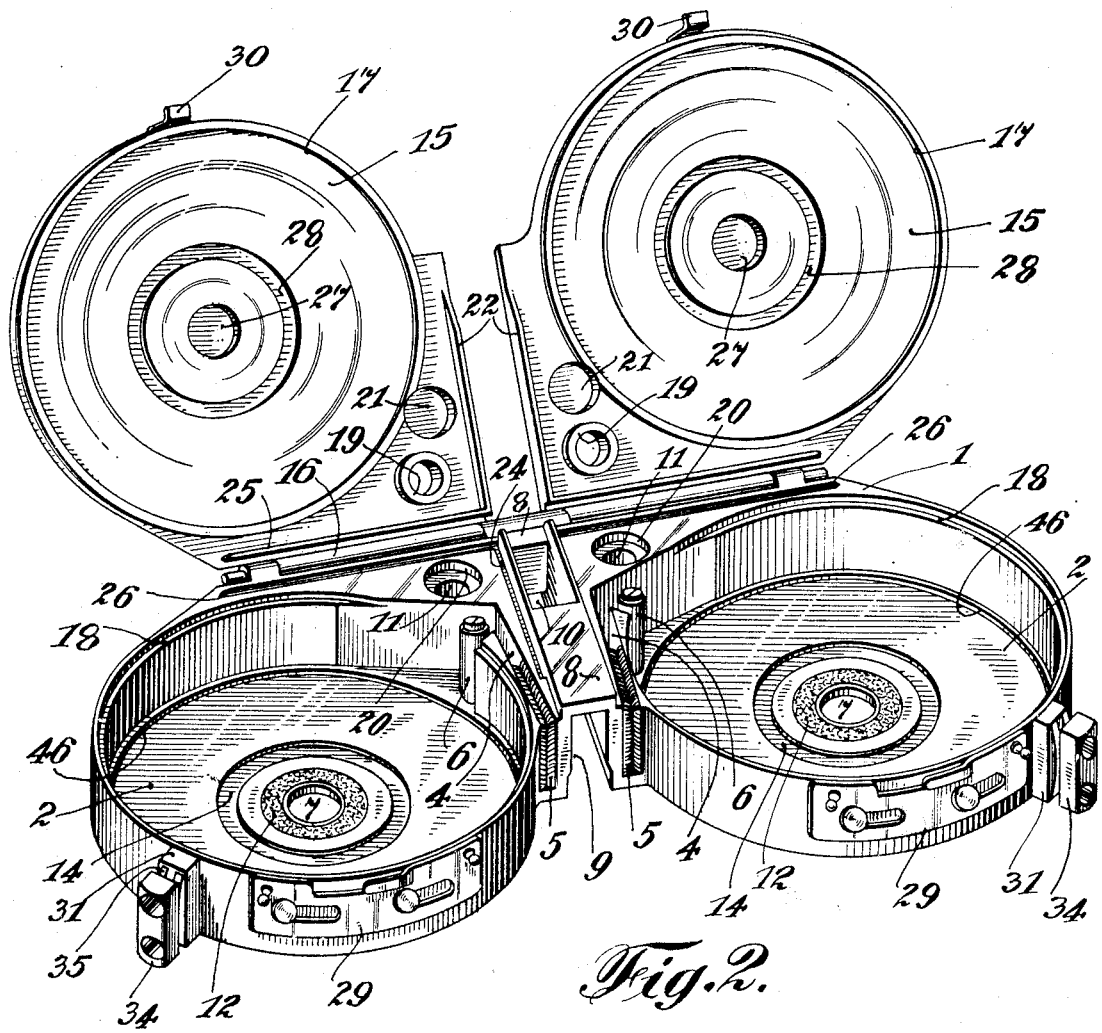
Fig. 2 is a perspective view of the removable magazine illustrating the construction thereof, and showing the magazine empty.
Figure 3:
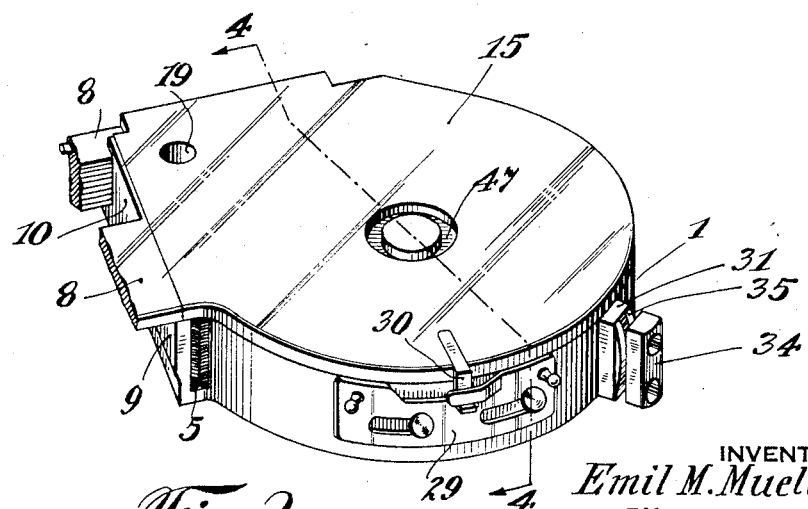
Fig. 3 is a detail view of one magazine pocket with the lid closed.

Referring to Figs. 1 and 2, the preferred form of the invention comprises a main casing 1. (Since the device is provided with pairs of parts and pairs of similar features, a single designating character will be used hereinafter to designate both members of a pair.) The casing 1 is provided with a pair of pockets 2 of sufficient diameter and depth to receive standard commercial fifty foot rolls of 16 mm. film. Film leadways 4 lead from each pocket through the forward portion of the main casing 1. These film pockets 4 are provided with light gates or valves 5 which may comprise pieces of velvet, felt or other soft material preferably of dark color such as black, with an opening between these light valves for the passage of the film so that the light valves bear gently against the film and at the same time exclude light from passing into the film leadways. Anti-friction guide rolls 6 are provided to guide the film into the leadways 4. Each of the pockets 2 are provided with openings 7 through which the driving posts of the camera extend to engage the film reels within the light pockets. Bridge members 8 are provided over a slot 9 to connect one end of the casing with the other and to enable the slot 9 to accommodate a portion of the camera mechanism as will be later described. The bridge members 8 are cut away to provide an opening 10 through which the camera operating mechanism may be manipulated. The back of the casing 1 is provided with a pair of openings 11 extending through the casing to receive film guide pins which are a part of the standard Filmo camera. The bottom of the pockets 2 carry a ring 12 of felt, velvet or other light excluding material preferably a dark color such as black, which ring is adapted to bear against the bottom of the film spool to prevent light leaking through the openings 7. Preferably, grooves 14 are provided concentric with the light valve rings 12 to accommodate swaged lugs forming a part of the standard fifty foot reel, so that these lugs do not bear against the bottom of the casing and cause unnecessary friction.

The pair of light pockets 2 are adapted to be closed by a pair of hinged covers 15, which are pivoted by means of hinges 16 to the main casing 1. The cover members have depending rings 17 which set within recessed shoulders 18 in the pockets 2 in order to intercept any light which might leak in under the covers 15. Small rings 19 similarly set into recesses 20 around the openings 11 to prevent leakage of light through these openings 11. The covers 15 are also provided with recesses 21 to accommodate the upper ends of the anti-friction rolls 6. Ribs 22 are provided along the edge of the covers and are adapted to set in the grooves 24 provided in the main frame to intercept light which may tend to come in from the inner edges of the covers. Similar ribs 25 are provided along the back edges of the covers and fit into grooves 26 in the main frame parallel to the hinges 16 to block any light which may tend to leak from this joint. The centers of the covers 15 comprise recesses 27 to accommodate the upper ends of the operating posts of the camera which extend through the pockets 2 and ring grooves 28 are arranged in the covers 15 concentric with the recesses 27 to provide for the upstruck or swaged lugs on the reels in a manner similar to the grooves 15 in the bottoms of the pockets 2.

The front portion of the pockets 2 carry sliding docking members 29 which are adapted to engage latches 30 on the covers to lock the covers securely closed after the magazine has been loaded with film. Spring pressed blocks shown in Figs. 1, 2, 3, and 6 are provided on the front of the magazine to hold the magazine in place in the camera and each of these blocks comprise a base block 31 attached to the main frame 1 and carrying guide screws 32 which extend through the movable block 34 to limit the outward movement of this block. Springs 35 tend to move the movable blocks 34 outwardly to the limit allowed by the guide screws 32.

Figure 5:
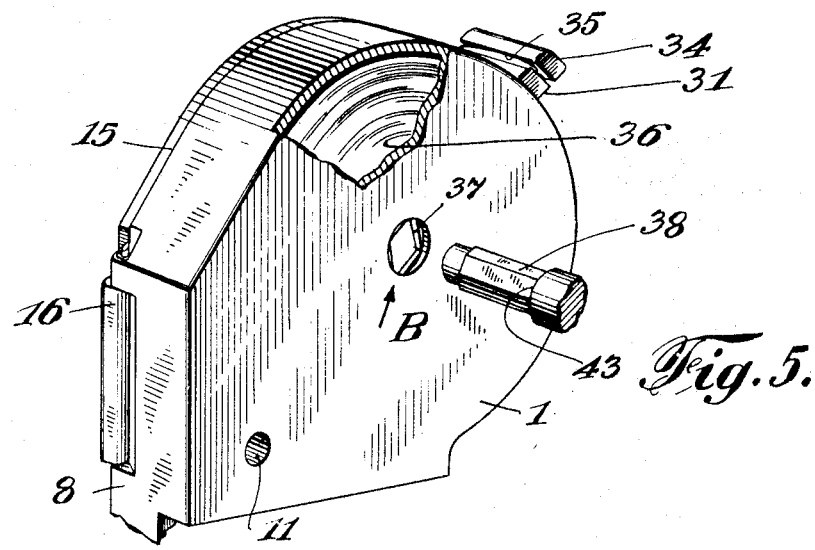
Fig. 5 is a back view of the pocket illustrated in Fig. 3 with a portion of the casing broken away and illustrating the manner in which the operating post of the camera fits into the drive opening in the reel within a magazine pocket.

Referring now to Figs. 1 and 5, assuming that a fifty foot full reel has been mounted in the upper pocket 2 and the cover is closed and with the film A extending out of the casing in the form of a loop and threaded through the respective light openings back to a fifty foot reel within the lower pocket. The device is ready to be loaded into the camera. The reels 36 are provided with squared openings 37 which may be adjusted by a key or otherwise in such manner that corners of the squared openings 37 in the reels are opposite the indicating arrow B on the magazine. The reels will now slide easily over the operating pins 38 of the camera. (One of these pins is illustrated in Fig. 5, but it is well known in the art that the Filmo camera is provided with two such pins, one of which carries the supply roll and the other of which is power operated to drive the take-up roll.) The magazine is now slipped into place in the film compartment of the Filmo camera 39. The rear film guide pins 40 of the camera extend through the openings 11 in the magazine, and the reels 36 set on the shoulders 43 on the operating pins 38 so that there is no substantial added friction on the reels due to the magazine. The slot 9 accommodates the gate lever 41 of the camera so that the operating knob 42 thereof is accessible through the opening 10 in the bridge 8 of the magazine. The gate of the camera is opened and the loop A of the film is threaded over the film sprockets 44 of the camera and the gate 45 is closed. The camera is operated for a few feet to be certain the threading is correct and then the camera side plate is set over the magazine and locked in position so that the magazine is entirely enclosed within the light tight film chamber of the camera. When the magazine is in place, the movable blocks 34 bear against the inner front side of the camera casing to force the back of the magazine against the back of the camera casing whereby the magazine is securely held in place. The camera is now ready for operation and the operator may use such portion of the special film from the magazine as is desired.

Figure 4:
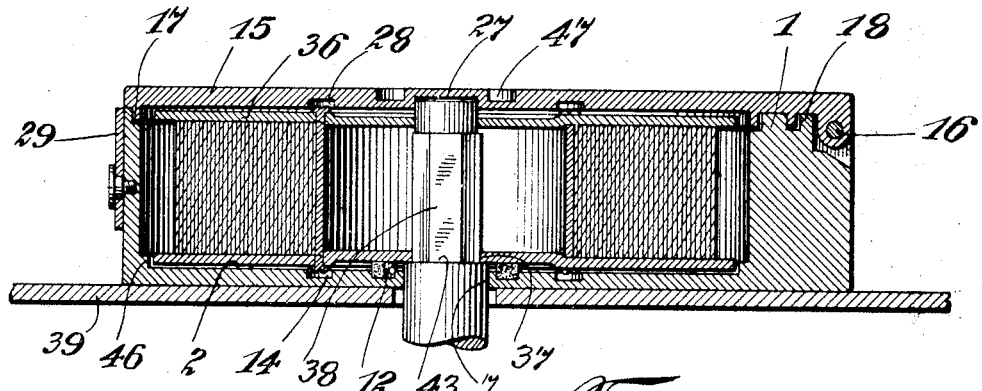
Fig. 4 is a sectional view taken on line 4—4 of Fig. 3, and illustrating an operating post of the camera extending into the film reel.
Figure 6:
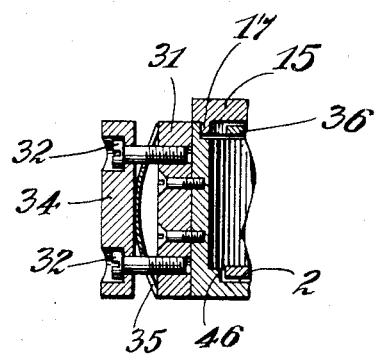
Fig. 6 is a detail of a spring pressed block carried by the magazine and adapted to bear against the inside of the camera casing to hold the removable magazine in place within the film chamber of a camera.
Figure 7:
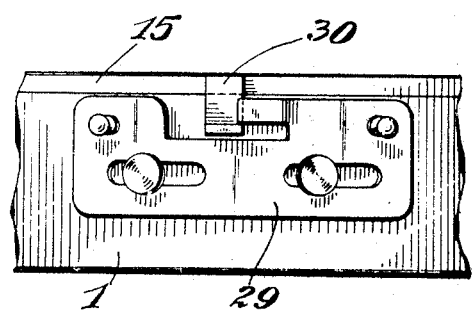
Fig. 7 is a detail of one of the locking latches adapted to lock the lid of one of the magazine pocket members.

It will be observed by reference to Figs. 1 and 4 that the bottom of the pockets 2 are provided with circular shoulders 46 which are opposite to the lower members of the reels 36. This shoulder is a safe guard to block and stop any light that may leak past the light valve 12.

When the operator desires to change magazines, the side of the camera is removed, as is well known in the art, and the magazine is lifted from the camera casing. During this operation, the loop A of the film extending outside the casing is light struck whereas the film within the pockets 2 is preserved from being light struck. The operator may proceed to load the camera with another film, for example, a separate magazine, which may again be replaced by the first magazine when desired. It will be observed that a pair of grooves 47 are provided on the top of the covers 15 which grooves are for the purpose of accommodating projections from the removable lid or side of the camera which extend inwardly from the Filmo camera cover, as side guides for film reels when the magazine is not being used.

While for the purpose of the patent laws, the present invention has been described as adapted to the well known commercial Filmo camera, it is to be understood that the magazine may be adapted for use with other makes of movie cameras.

Having thus described my invention, what I claim is:

1. An auxiliary reel holder for moving picture cameras comprising a pair of independent light tight pockets, rigid means connecting said pockets together as an entity, each of said pockets being provided with individual closure means independent of the closure for the other pocket, circular grooves in said closure means to accommodate reel lugs, said pockets being provided with centrally located openings adapted to receive camera operating posts, concentric grooves in the bottoms of said pockets to accommodate reel lugs, light valves mounted in said pockets and adapted to cooperate with a standard film reel to prevent light entering through said holes from reaching the film upon said spool, and conduits leading to the exterior of said pockets.

2. An auxiliary film magazine comprising a body portion provided with a pair of pockets adapted to hold film reels, openings in said pockets to permit operating posts to extend into said pockets and support the film reels therein, film conduits leading from said pockets through said body portion to permit the formation of a loop of film between said pockets and outside said magazine, light tight valves in said conduits, said body portion being provided with a transverse slot between said film conduits, which slot is adapted to bridge over camera operating mechanism when the magazine is in place, and spring means to retain said magazine securely in place within the film chamber of a camera.

3. An auxiliary film magazine comprising a body portion provided with a pair of pockets adapted to hold film, film conduits leading from said pockets through said body portion to permit the formation of a loop of film between said pockets and outside said magazine, light tight valves in said conduits, said body portion being provided with a transverse slot between said film conduits, which slot is adapted to bridge over camera operating mechanism when the magazine is in place, and spring means adapted to force said body against the camera casing to retain said magazine securely in place within the film chamber of a camera, said body portion having openings to accommodate film guides provided in the camera for larger size film reels.

4. An auxiliary film magazine for moving picture cameras comprising a body portion provided with a pair of pockets adapted to receive moving picture reels, light tight closures for said pockets, said pockets being provided with openings to receive reel holding posts of said camera, the bottoms of said pockets being provided with recesses and shoulders which terminate adjacent the lower flanges of reels within said pockets, said shoulders being adapted to intercept any light entering through said openings.

EMIL M. MUELLER.